United States Patent
Chee

[19]

[11] Patent Number: 6,088,806
[45] Date of Patent: Jul. 11, 2000

[54] APPARATUS AND METHOD WITH IMPROVED POWER-DOWN MODE

[75] Inventor: Lawrence Chee, Vancouver, Canada

[73] Assignee: Seiko Epson Corporation, Tokyo, Japan

[21] Appl. No.: 09/175,622

[22] Filed: Oct. 20, 1998

[51] Int. Cl.[7] .............................. G06F 1/08; G06F 1/32; G06F 9/00
[52] U.S. Cl. .......................... 713/322; 713/300; 713/601
[58] Field of Search ..................................... 713/322, 323, 713/310, 321, 300, 601; 714/733; 377/16; 365/226; 326/93, 99; 327/144, 198; 345/112, 204; 340/825.06

[56] References Cited

U.S. PATENT DOCUMENTS

| | | |
|---|---|---|
| 4,450,442 | 5/1984 | Tanaka . |
| 4,468,662 | 8/1984 | Tanaka . |
| 4,626,837 | 12/1986 | Priestly . |
| 4,926,166 | 5/1990 | Fujisawa et al. . |
| 5,047,759 | 9/1991 | Takebe et al. . |
| 5,167,024 | 11/1992 | Smith et al. . |
| 5,218,704 | 6/1993 | Watts, Jr. et al. . |
| 5,230,074 | 7/1993 | Canova, Jr. et al. . |
| 5,247,286 | 9/1993 | Ishikawa . |
| 5,347,630 | 9/1994 | Ishizawa et al. . |
| 5,369,771 | 11/1994 | Gettel . |
| 5,388,265 | 2/1995 | Volk . |
| 5,390,293 | 2/1995 | Nishioka et al. . |
| 5,396,635 | 3/1995 | Fung . |
| 5,448,262 | 9/1995 | Lee et al. . |
| 5,452,434 | 9/1995 | MacDonald . |
| 5,483,464 | 1/1996 | Song . |
| 5,504,910 | 4/1996 | Wisor et al. . |
| 5,521,768 | 5/1996 | Shrinkle et al. . |
| 5,587,672 | 12/1996 | Ranganathan et al. . |
| 5,615,376 | 3/1997 | Ranganathan . |
| 5,630,145 | 5/1997 | Chen . |
| 5,638,541 | 6/1997 | Sadashivaiah . |
| 5,675,810 | 10/1997 | Sellers . |
| 5,675,812 | 10/1997 | Nagashige et al. . |
| 5,692,197 | 11/1997 | Narad et al. . |
| 5,708,819 | 1/1998 | Dunnihoo . |
| 5,710,929 | 1/1998 | Fung . |
| 5,721,936 | 2/1998 | Kikinis et al. . |
| 5,757,365 | 5/1998 | Ho . |

FOREIGN PATENT DOCUMENTS

| | | |
|---|---|---|
| 0 368 117 | 5/1990 | European Pat. Off. . |
| 0 419 910 | 4/1991 | European Pat. Off. . |
| 0 498 148 | 8/1992 | European Pat. Off. . |
| 0 645 691 | 3/1995 | European Pat. Off. . |
| 0 655 725 | 5/1995 | European Pat. Off. . |
| 6-59655 | 3/1994 | Japan . |
| 4659653 | 3/1994 | Japan . |
| WO 94/12969 | 6/1994 | WIPO . |

*Primary Examiner*—Gopal C. Ray

[57] ABSTRACT

A power-down circuit (72) in a lap-top computer (10) cooperates with a separate monitor circuit (80) in each of a plurality of modules (68, 74, 76) that a video-display-controller integrated circuit (36) includes. In response to various stimuli, decoding logic (78) in the power-down circuit sends respective power-down-request signals to the various monitor circuits request permission to suppress application of respective clock signals to them. If a module's operational circuitry (82) is in a state in which clock removal is safe, the monitor circuit (80) responds with an acknowledgment signal, and the power-down circuit (72) causes a clock generator to interpret application of clock signals to the respective module (68). The monitor circuit (80) may additionally detect circumstances in which removing the clock signal from the operational circuitry (82) is safe only if the clock signal can subsequently be re-applied rapidly. In those circumstances, the monitor circuit (80) generates an idle signal that causes the power-down circuit (72) to stop clocking the associated operational circuitry but continue clocking the monitor circuit. In this way, the monitor circuit can keep operating so as to detect circumstances that will necessitate re-starting operational-circuit clocking. When it detects such a condition, it rapidly de-asserts the idle signal so that the clock signal is rapidly re-applied to the associated operational circuit.

24 Claims, 5 Drawing Sheets

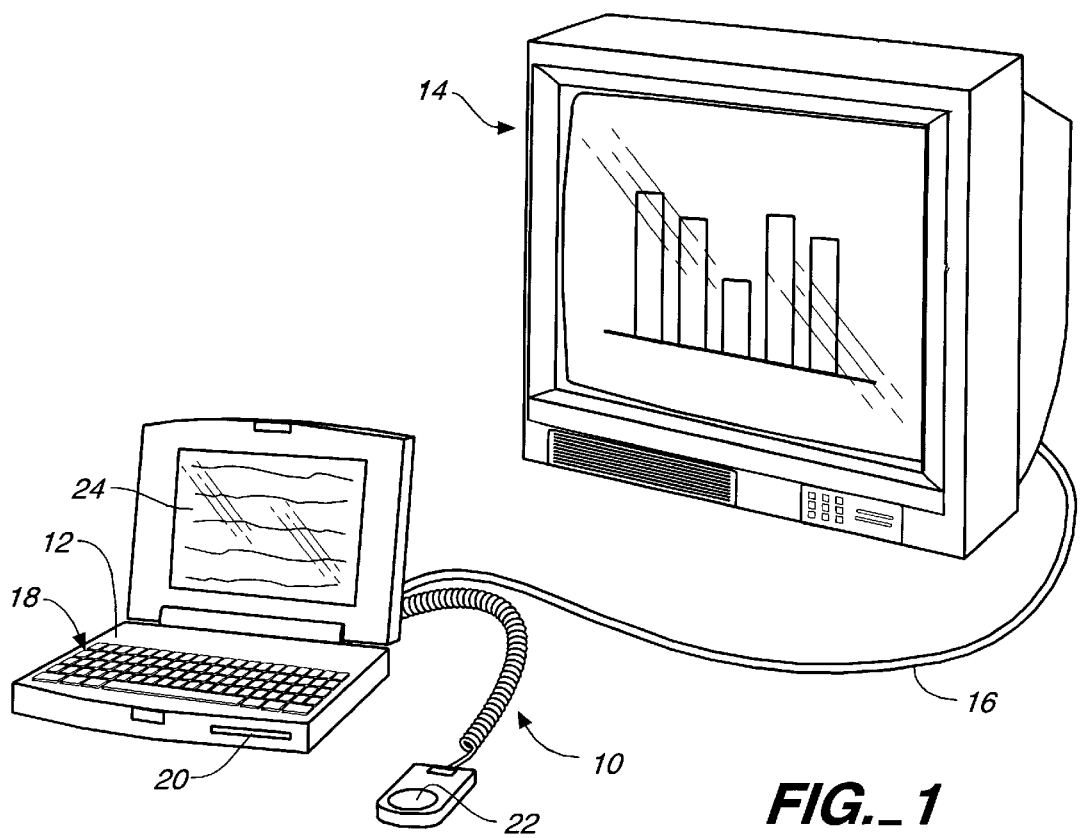
FIG._1
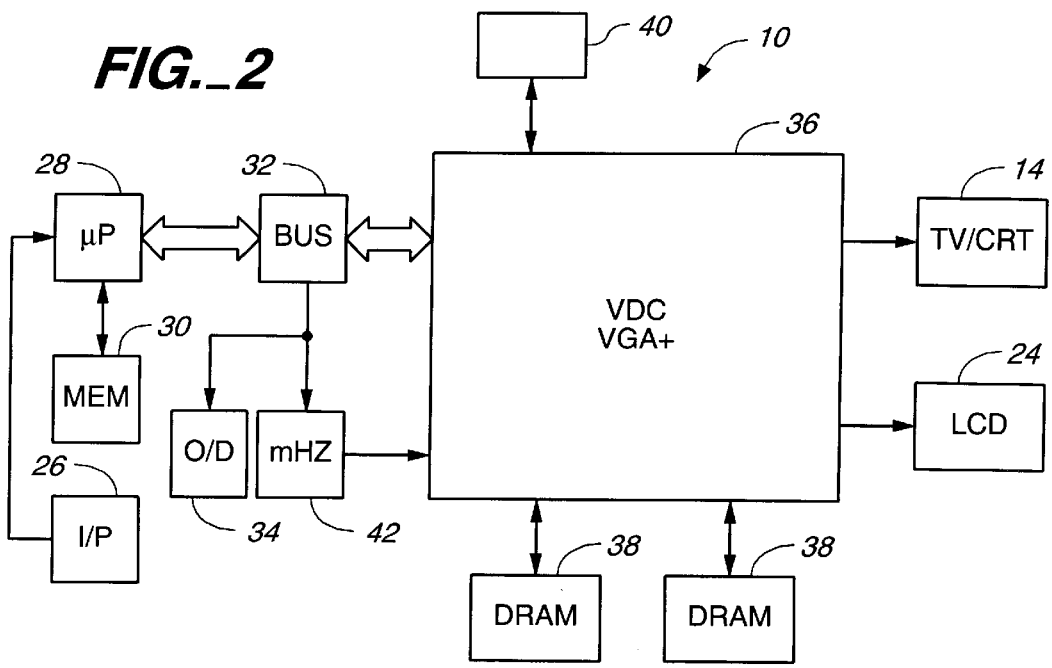
FIG._2

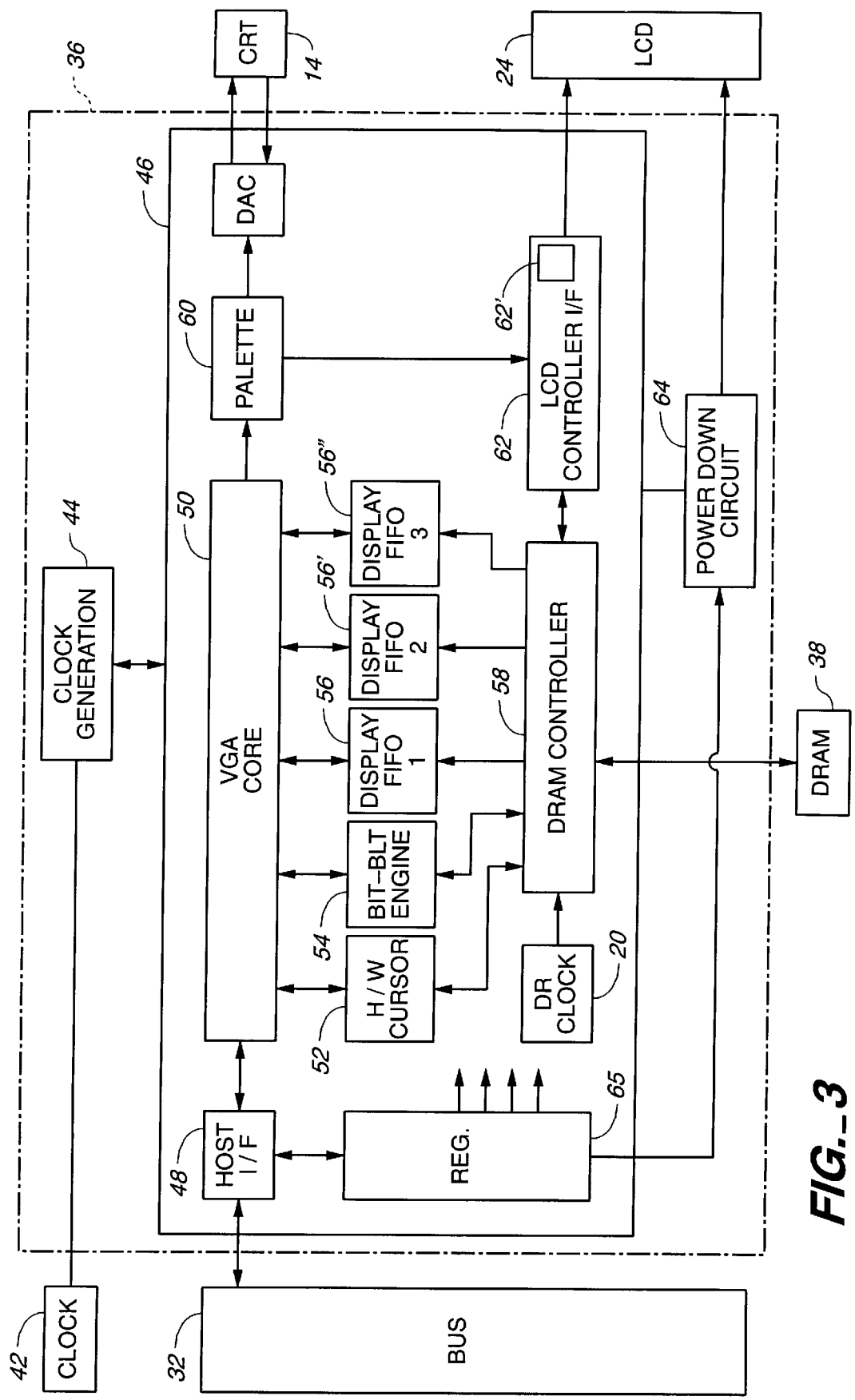
FIG._3

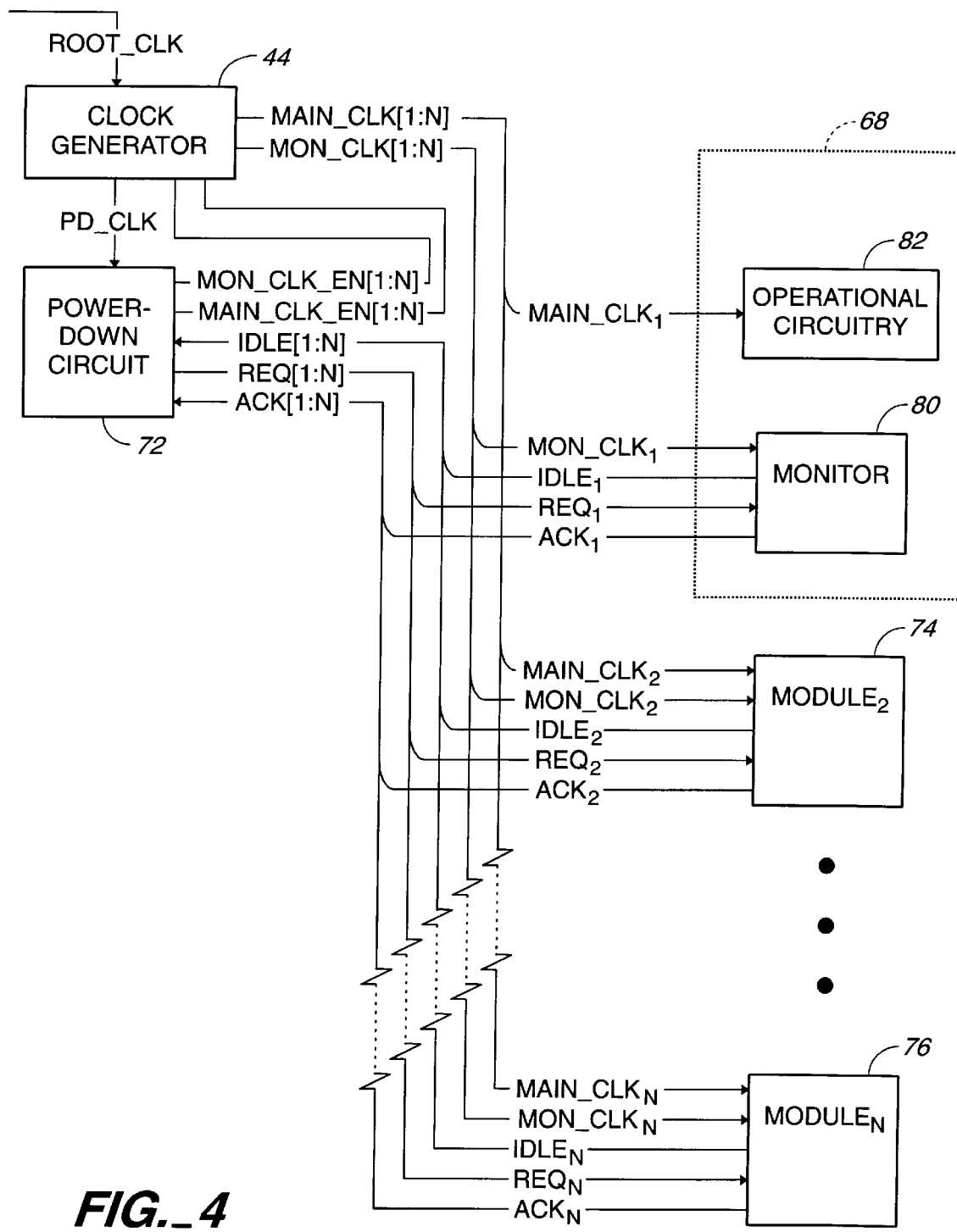
FIG._4

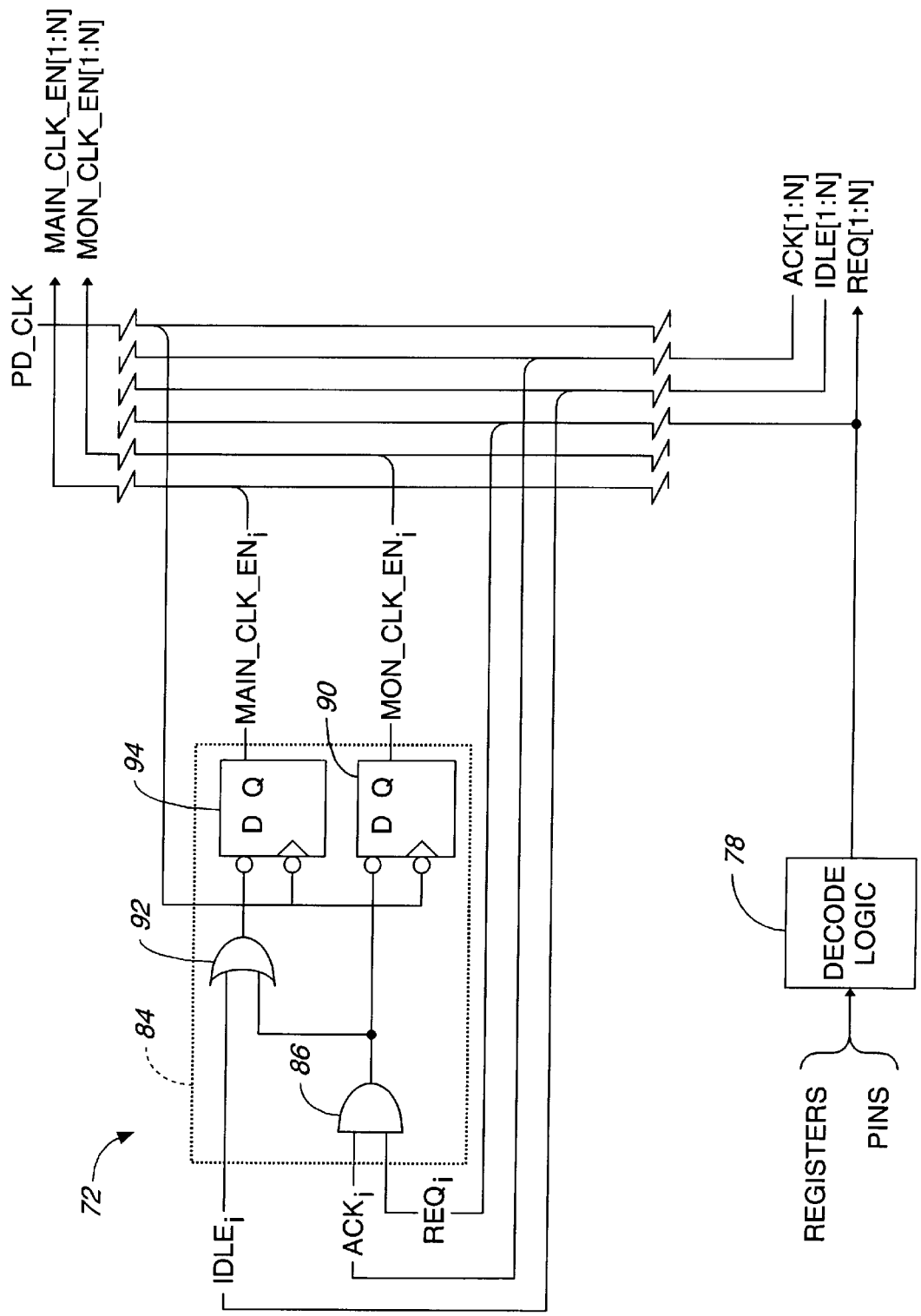
FIG._5

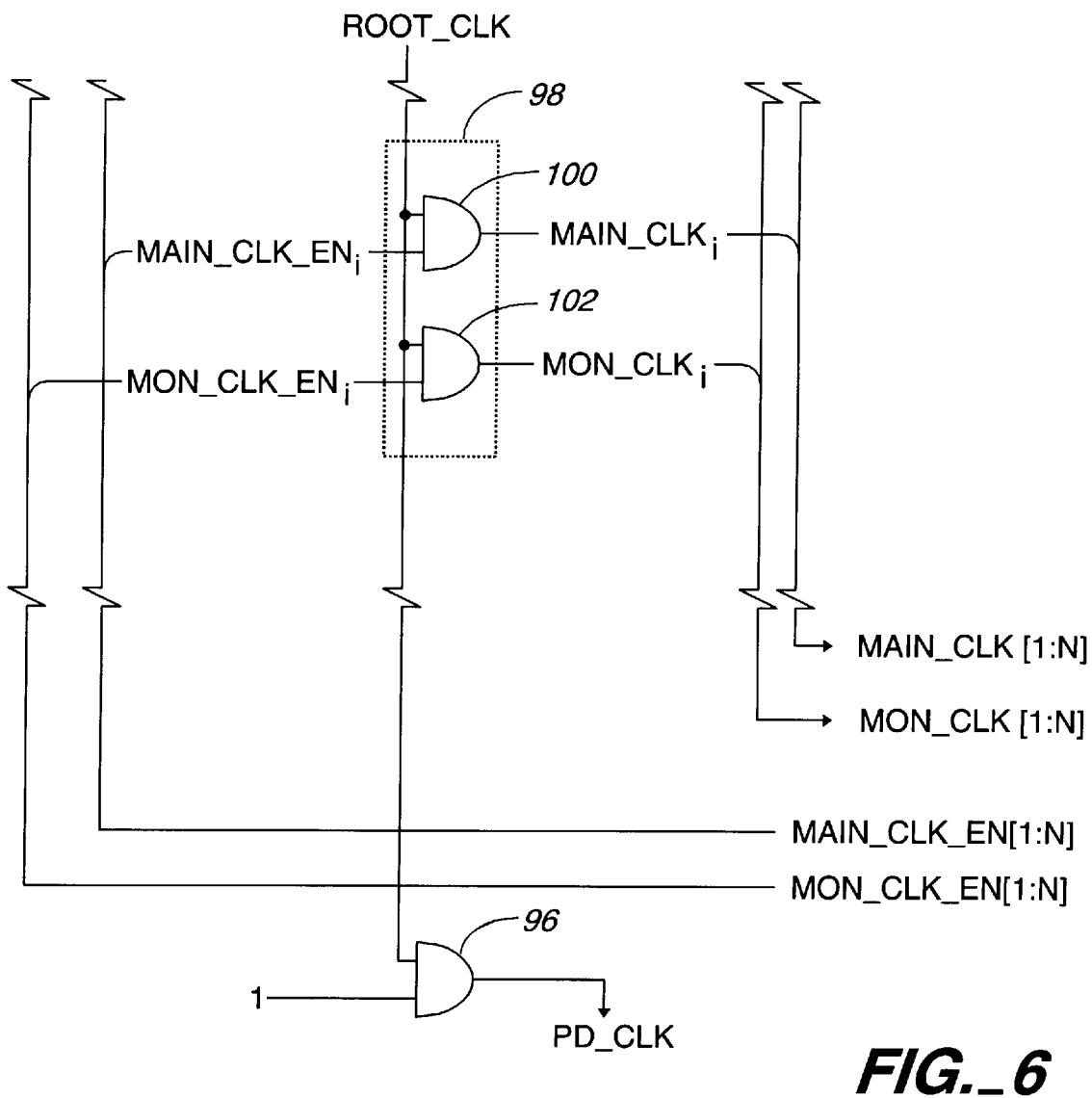
FIG._6

APPARATUS AND METHOD WITH IMPROVED POWER-DOWN MODE

BACKGROUND OF THE INVENTION

The present invention is directed to computer systems and in particular to the power-conservation systems that they employ.

In lap-top and similar portable computers, one of the most critical features is the computer's power consumption: the less power the computer requires, the longer it can be used without recharging its batteries. In addition to expending a great deal of effort in reducing the power that various components draw when they are operating, therefore, workers in this art have additionally provided their computer systems with power-down circuitry, which turns off parts of the computer system when they are not needed. In U.S. Pat. No. 5,708,819 to Dunnihoo, for instance, a computer system's input-output controller removes power from the keyboard, floppy-disc controller, etc., when they are not in use. Similarly, U.S. Pat. No. 5,710,929 to Fung includes a power-control circuit that causes various of a computer's components to assume power-on, doze, sleep, suspend, and off states. By monitoring an input/output bus for various address ranges, it determines which states the various components should assume. And various network computer systems disclosed in U.S. Pat. No. 5,692,197 to Narad et al. determine when to enter respective power-down states, from which they may "wake" in response to various external signals.

While all of these approaches do serve the purpose of limiting power use, the fact remains that portable-computer battery life in general remains shorter than users would prefer.

SUMMARY OF THE INVENTION

I have recognized that overall power consumption can be reduced significantly further if separate modules within an individual integrated circuit employ a combination of active and passive power-down control. The way to implement this is to provide each of a number of the integrated circuit's modules with respective monitor circuits that are clocked by monitor-clock signals separate from main-clock signals that clock these modules' operational circuitry.

Since the monitor circuits are dedicated to respective individual modules, they can be optimized to that particular module's activity and thus detect with particular exactitude the conditions in which it is safe to interrupt of those modules' main clock signals and thereby minimize their power consumption. As soon as such a condition is detected, the monitor circuit asserts an idle signal that causes the respective module's main-clock application to be inhibited. The monitor circuit is able to continue its monitoring operation because it is separately clocked. So it can detect when the module must again be activated, and it can de-assert the idle signal and thereby permits application of the associated main-clock signal.

In accordance with the invention, though, the monitor circuit's power consumption, too, can be inhibited at an appropriate time. Specifically, the integrated circuit additionally includes a power-down controller that determines, typically in response to various external stimuli, when it would be desirable to reduce power consumption more completely. When this occurs, the power-down controller sends the monitor circuit a power-down request signal. In response to the signal, the monitor circuit determines whether the module is in a condition from which it is safe to remove clock application completely, possibly after taking action to place it in such a state. In any case, it sends the power-down circuit an acknowledgment signal when such a state is reached, and the power-down circuit then removes both that module's main-clock signal and the monitor-clock signal applied to its monitor circuit. By using this approach, the integrated circuit can provide the capability for a general power removal and yet afford a very fine-grained control of individual modules' power usage.

BRIEF DESCRIPTION OF THE DRAWINGS

The invention description below refers to the accompanying drawings, of which:

FIG. 1 is a perspective view of a computer system in which the present invention's teachings may be employed;

FIG. 2 is a block diagram of the environment in which that computer system's video controller operates;

FIG. 3 depicts the various video-controller modules whose power consumption can beneficially be controlled by employing the present invention's teachings;

FIG. 4 is a block diagram depicting the exchange of signals among the video controller's clock generator, power-down circuit, and various constituent modules;

FIG. 5 is a more-detailed block diagram of the power-down circuit itself; and

FIG. 6 is a more-detailed block diagram of the clock generator.

DETAILED DESCRIPTION OF AN ILLUSTRATIVE EMBODIMENT

FIG. 1 depicts a computer system 10 that includes a notebook computer 12 and an additional display device 14 interfaced with the notebook computer via a cable 16. The additional display device 14 is illustrated as a conventional television. Those ordinarily skilled in the pertinent arts will recognize that the television accepts signals in NTSC format and displays an interlaced image. Alternatively, the computer system 10 may be interfaced with a conventional CRT monitor using RGB signals and providing a non-interlaced image. The notebook computer includes various input devices, such as a keyboard 18, a floppy disk drive 20, and a track ball 22. Those ordinarily skilled in the pertinent arts will recognize that the track ball is essentially a stationary mouse input device. The computer system 10 may include additional input devices, such as a hard disk drive, a CD-ROM, and a serial input-output (I/O) port. Several of these devices also function as output devices for the computer system 10 in addition to a liquid crystal display 24. As described hereinbelow, the display 24 is presented as being of dual panel type. As depicted, the notebook computer is being used to perform a multi-task operation. For example, the notebook computer 12 may be used to conduct a financial analysis, the data for which is displayed on LCD 24, and a graphical depiction of which is displayed on CRT 14.

FIG. 2 provides a schematic block diagram of the computer system 10, with the input devices all subsumed within one representative block 26. The input devices are interfaced with a microprocessor 28, which also has an interface with a memory facility 30. The memory facility 30 will include the floppy disk drive 20, and may include a hard disk drive, CD-ROM, and other devices. A data bus 32 interfaces with the microprocessor 28 and provides an interface with the output devices, including the LCD and CRT image display devices 14 and 24. The other output devices for the computer system 10 are subsumed in a representative block 34. In order to facilitate the interface with the image display devices 14 and 24, the computer system 10 includes a video display controller (VDC) 36 interfacing with the bus 32 and providing driving signals for the LCD 24 and CRT 14. The VDC has an interface with dynamic random access memory (DRAM), represented on FIG. 2 with the schematic blocks 38. Also, the VDC has an interface with a power management facility 40 of the computer system 10. A dedicated clock 42 provides a reference clock rate to the VDC 36.

FIG. 3 shows that the VDC 36 includes an internal clock 44 referenced to the clock signal from the dedicated clock 42, and providing clock signals to a video section 46 of the VDC. In order to interface the video section 46 with the bus 32, and hence with the microprocessor 28, the video section 46 includes a programmable host interface 48. The host interface 48 is programmable to configure the VDC 36 for interface with a number of conventional bus configurations. For example, host interface 48 may be configured for interface with a conventional Intel 486DX local bus, with a VL-Bus, and with a PCI interface bus. The host interface 48 interfaces the bus 32 with a VGA core portion 50 of the VDC 36. This VGA core portion 50 includes a sequencer, to be further described below, a cathode ray tube controller (CRTC), a graphics controller, an attribute controller, and conventional VGA circuitry.

In order to allow the VGA core 50 to generate and control the text, graphics and other visual characters to be displayed on the CRT and LCD (such as a cursor and icons, for example), the VGA core is interfaced with a hardware cursor generator 52, a bit-BLT engine 54, and a display FIFO 56. An additional two display FIFOs 56', and 56" are also interfaced with the VGA core 50 to support the computer system 10's dual-display operation.

The hardware cursor generator 52 selectively provides a cursor of increased size (i.e., twice as large as normal, for example), which is easier to visually follow as it moves across a display screen, in response to detection of a certain preselected speed of movement of the cursor provided by a software program running on microprocessor 28. Thus, when a user of the computer system 10 uses the mouse or keyboard keys to move the cursor of a program, if the speed of movement reaches the preselected threshold, then the cursor becomes doubled or larger. The bit-BLT engine, as was explained earlier, provides for block transfers of bits generated to provide graphics and other such visual characters on the CRT and LCD screens 14 and 24.

Each of the hardware cursor generator 52, bit-BLT 54, and display FIFO 56 are also interfaced with a DRAM controller 58. This DRAM controller 58 implements the functions of the DRAM controller/sequencer described in general terms above to arbitrate and implement requests for access to the DRAM by various functional units of the computer system 10, including other portions of the VDC 36. As is seen in FIG. 3, the DRAM controller 50 has an interface with the DRAM 38. The display FIFO 56 has an interface (via the VGA controller 50 and DRAM controller 58) with both a palette controller 60 and a liquid crystal display (LCD) interface controller 62. The palette controller implements the standard 256-by-18 VGA palette, while the LCD interface controller performs frame modulation and dithering for 64 shades of gray and 256 K colors.

The VDC 36 includes a power-down controller 64. This power-down controller has an interconnection with a power-down register 65, which itself has a generalized interconnection within the VDC 36. This generalized interconnection of the power-down-register 65 is indicated on FIG. 3 with the plurality of arrows leaving the register 65.

Part of the DRAM controller 58's circuitry is timed to operate in synchronism with the various display FIFOs 56', and 56". Another part, module 68 (FIG. 4), is instead synchronized to the timing of the DRAM 38 (FIG. 3), as FIG. 3 indicates by its DRAM clock 70.

As will be explained below, a portion 72 of FIG. 3's power-down circuit 64 is dedicated to controlling power application to module 68 as well as other modules 74 and 76, which represent similarly synchronized portions of the various elements that FIG. 3 depicts. FIG. 4's circuitry is typically replicated for each "clock zone." Each clocked element in a single clock zone is clocked by a clock signal of a common frequency associated with that zone or by a clock signal whose frequency is an integer submultiple of that common frequency. Also, the leading edges of all clocks in the same clock zone coincide.

As FIG. 5 illustrates, the power-down circuitry 72 includes decoding logic 78, which determines, on the basis of inputs from various of the video-display controller 36's input pins and the contents of its registers 65 (FIG. 3), whether conditions are such that it is appropriate to remove power from all or a subset of the video-display controller 36's modules. If so, it sends respective request signals REQ [1:N] to the modules that are to be powered down. Specifically, it sends them to respective monitor circuits, such as module 68's monitor circuit 80. Circuit 80 treats the respective request signal as asking whether its respective module 68 is in a state from which all of its clock signals can safely be suppressed.

In the case of the DRAM controller 58, for instance, a state may have been reached in which no further data are to be applied to the DRAM controller 58 for storage into the DRAM 38. This suggests that it may be appropriate to power-down the DRAM controller 58, so the decode logic 78 of FIG. 5 sends a request signal $REQ_1$ to module 68's monitor circuit 80 to ask whether clock removal is safe. But module 68's operational circuitry 82 may still be in the process of loading previously received data into the DRAM 38, in which case the monitor circuit 80, which observes the operational circuitry 82's operation, will not respond with a corresponding acknowledgment signal ($ACK_i$) until that loading operation has been completed. When the loading operation ends, though, the monitor circuit 80 concludes that it is appropriate to power module 68 down, and it accordingly asserts $ACK_1$ to indicate this condition.

FIG. 5's power-down circuit segment 84 is one of a number of segments that the power-down circuit provides for respective ones of the modules that FIG. 4 depicts. When a given monitor circuit asserts its acknowledgment signal $ACK_i$ in response to its respective request signal $REQ_i$, the resultant asserted output of AND gate 86 is latched in by a D-type flip-flop 88 after inversion and causes an OR gate 90 to assert its output, which another D-type flip-flop 92 latches in after inversion. These flip-flops 88 and 92 receive as their common clock input a power-down-clock signal PD_CLK, which FIG. 6's enabled skew-aligning gate 96 generates from the root-clock signal ROOT_CLK that FIG. 3's clock generator 44 produces for the clock zone that the FIG. 4 circuitry occupies.

On PD_CLK's next negative-going transition, FIG. 5's flip-flops 88 and 92 latch in the values of their de-asserted inputs to de-assert clock signals $MAIN\_CLK\_EN_i$ and $MON\_CLK\_EN_i$. The power-down circuitry 72 sends the thus de-asserted clock-enabling signals to clock generator 44. As FIG. 6 indicates, the clock generator includes a gating segment such as the illustrated gating segment 98 for each of FIG. 4's modules, and the de-asserted clock-enabling signals MAIN_CLK_EN$_i$ disable the gates 100 and 102 whose out-puts MAIN_CLK$_i$ and MON_CLK$_i$ ordinarily clock a corresponding module's operational circuitry and monitor element, respectively. This effectively suppresses power dissipation in the associated (typically CMOS) module.

In this way, various system- or chip-wide criteria may be employed to determine whether to request a power-down sequence, whereas a local monitoring circuit, which can be designed specifically for an individual module's characteristics, determines whether the particular module can actually be powered down. The monitoring circuit may additionally perform various functions that prepare the module for the powered-down condition.

In accordance with my invention, though, the monitor circuits provide an opportunity for even finer-grained power control. In most modules, there are situations in which most of the circuitry could be powered down safely if it were possible to return power quickly under various circumstances. The criteria for determining whether such a state can be entered depend very much on the particular module's specific features, as do the situations that require power to be re-applied. My invention lends itself particularly to tailoring power removal and re-application to a particular module's characteristics. In accordance with the invention, the monitor circuits receive monitor clocks MON_CLK$_i$ that are separate from the main clock signals MAIN_CLK$_i$ by which the monitored operational circuitry is timed. So the monitor circuits can call for power removal even when power re-application may subsequently have to be re-applied rapidly, and they can individually monitor their associated operational circuitry's environment for indications that power needs to be reapplied.

Specifically, when a monitor circuit detects a situation in which power removal is appropriate, it sends the power-down circuitry a respective idle signal IDLE$_i$. As FIG. 5 shows, this causes NOR gate 90 to de-assert flip-flop 92's input so that a de-asserted MAIN_CLK_EN$_i$ signal will disable FIG. 6's gate 100. That gate thereupon suppresses the MAIN_CLK$_i$ signal that clocks the associated operational circuitry. But the monitor circuitry that generates the idle signal still receives its separate monitor clock, so it can continue to operate and determine when power must be re-applied, to its associated operational circuitry. When it does determine that power should be re-applied, it de-asserts its idle signal, thereby causing its associated operational circuitry's main clock signal to be re-applied. Since a module's monitor circuit is clocked separately from its operational circuitry, the operational circuitry can be powered down in situations in which doing so would otherwise be unsafe because of the speed with which it may need to be powered back up.

Although the illustrated embodiment depicts a single individual main clock for each individual monitor clock, there is no reason why the present invention's advantages cannot be realized without such a one-to-one correspondence. That is, a single one of the monitor circuits, which receives a single monitor-clock signal, could monitor a plurality of separately clocked operational circuits, generating a different idle signal for each. Also, although the illustrated embodiment employs a separate request signal for each of the modules, the invention's broader teachings can be implemented in embodiments that employ a common request signal for all modules, at least within the same clock zone. Finally, although the foregoing description specifically discusses only the power-down circuitry associated with a single root clock for a single clock zone, a typical embodiment will duplicate the illustrated power-down circuitry for each of its clock zones.

So the present invention can be implemented in a wide range of embodiments and this constitutes a significant advance in the art.

What is claimed is:

1. An integrated circuit including:

A) a plurality of modules, each of which includes at least one operational circuit timed by a respective separate main clock signal associated therewith;

B) a separate monitor circuit respectively associated with each module and receiving a respective monitor clock signal by which its operation is timed, the monitor circuit generating an idle signal associated with each operational circuit included in the module with which it is associated when that operational circuit's main clock signal can safely be discontinued and responding to a request signal applied thereto by determining whether its monitor clock can safely be discontinued and generating an acknowledge signal when it can;

C) a clock circuit that generates the main and monitor clock signals; and

D) a power-control circuit responsive to each said idle signal to suppress application of the respective main clock signal to the operational circuit with which that idle signal is associated, the power-control circuit being operable to apply a request signal to each monitor circuit and further being responsive to each said acknowledgment signal to suppress application of the respective monitor clock signal to the monitor circuit by which the acknowledgment signal was generated.

2. An integrated circuit as defined in claim 1 wherein the power-control circuit is additionally responsive to each said acknowledgment signal to suppress application of the respective main clock signal to each operational circuit included in the module associated with the monitor circuit that generated that acknowledgment.

3. An integrated circuit as defined in claim 2 wherein the power-control circuit is operable to apply a separate request signal to each monitor circuit.

4. An integrated circuit as defined in claim 3 wherein each said module includes only a single said operational circuit.

5. An integrated circuit as defined in claim 2 wherein each said module includes only a single said operational circuit.

6. An integrated circuit as defined in claim 1 wherein the power-control circuit is operable to apply a separate request signal to each monitor circuit.

7. An integrated circuit as defined in claim 6 wherein each said module includes only a single said operational circuit.

8. An integrated circuit as defined in claim 1 wherein each said module includes only a single said operational circuit.

9. An integrated circuit as defined in claim 1 wherein the clock generator includes a separate main-clock gate associated with each of a plurality of the operational circuits and applying its output to its associated operational circuit as its main clock signal, each main-clock gate operable by the power-control circuit between enabled and disabled conditions, receiving a power-down clock signal, forwarding to its associated operational circuit as its main clock signal the power-down clock signal applied to that gate when that gate is in its enabled condition, and blocking the power-down clock signal when that gate is in its disabled condition.

10. An integrated circuit as defined in claim 9 wherein the clock generator includes a separate monitor-clock gate associated with each of a plurality of the monitor circuits and applying its output to its associated monitor circuit as its monitor clock signal, each monitor-clock gate being operable by the power-control circuit between enabled and disabled conditions, receiving a power-down clock signal, forwarding to its associated operational circuit as its monitor clock signal the power-down clock signal applied to that gate when that gate is in its enabled condition, and blocking the power-down clock signal when that gate is in its disabled condition.

11. An integrated circuit as defined in claim 1 wherein the clock generator includes a separate monitor-clock gate associated with each of a plurality of the monitor circuits and applying its output to its associated monitor circuit as its monitor clock signal, each monitor-clock gate being operable by the power-control circuit between enabled and disabled conditions, receiving a power-down clock signal, forwarding to its associated operational circuit as its monitor clock signal the power-down clock signal applied to that gate when that gate is in its enabled condition, and blocking the power-down clock signal when that gate is in its disabled condition.

12. A computer system including a plurality of integrated circuits of which at least one includes:

A) a plurality of modules, each of which includes at least one operational circuit timed by a respective separate main clock signal associated therewith;

B) a separate monitor circuit respectively associated with each module and receiving a respective monitor clock signal by which its operation is timed, the monitor circuit generating an idle signal associated with each operational circuit included in the module with which it is associated when that operational circuit's main clock signal can safely be discontinued and responding to a request signal applied thereto by determining whether its monitor clock can safely be discontinued and generating an acknowledge signal when it can;

C) a clock circuit that generates the main and monitor clock signals; and

D) a power-control circuit responsive to each said idle signal to suppress application of the respective main clock signal to the operational circuit with which that idle signal was generated, the power-control circuit being operable to apply a request signal to each monitor circuit and further being responsive to each said acknowledgment signal to suppress application of the respective monitor clock signal to the monitor circuit by which the acknowledgment signal was generated.

13. A computer system as defined in claim 12 wherein the at least one integrated circuit includes a video-display controller.

14. A computer system as defined in claim 13 wherein the video-display controller includes a memory-control circuit that includes at least one said operational circuit.

15. A computer system as defined in claim 14 wherein the power-control circuit is operable to apply a separate request signal to each monitor circuit.

16. A computer system as defined in claim 15 wherein each said module includes only a single said operational circuit.

17. A computer system as defined in claim 14 wherein each said module includes only a single said operational circuit.

18. A computer system as defined in claim 14 wherein the clock generator includes a separate main-clock gate associated with each of a plurality of the operational circuits and applying its output to its associated operational circuit as its main clock signal, each main-clock gate operable by the power-control circuit between enabled and disabled conditions, receiving a power-down clock signal, forwarding to its associated operational circuit as its main clock signal the power-down clock signal applied to that gate when that gate is in its enabled condition, and blocking the power-down clock signal when that gate is in its disabled condition.

19. A computer system as defined in claim 18 wherein the clock generator includes a separate monitor-clock gate associated with each of a plurality of the monitor circuits and applying its output to its associated monitor circuit as its monitor clock signal, each monitor-clock gate being operable by the power-control circuit between enabled and disabled conditions, receiving a power-down clock signal, forwarding to its associated operational circuit as its monitor clock signal the power-down clock signal applied to that gate when that gate is in its enabled condition, and blocking the power-down clock signal when that gate is in its disabled condition.

20. A computer system as defined in claim 14 wherein the clock generator includes a separate monitor-clock gate associated with each of a plurality of the monitor circuits and applying its output to its associated monitor circuit as its monitor clock signal, each monitor-clock gate being operable by the power-control circuit between enabled and disabled conditions, receiving a power-down clock signal, forwarding to its associated operational circuit as its monitor clock signal the power-down clock signal applied to that gate when that gate is in its enabled condition, and blocking the power-down clock signal when that gate is in its disabled condition.

21. A computer system as defined in claim 12 wherein the power-control circuit is additionally responsive to each said acknowledgment signal to suppress application of the respective main clock signal to each operational circuit included in the module associated with the monitor circuit that generated that acknowledgment.

22. A computer system as defined in claim 21 wherein the power-control circuit is operable to apply a separate request signal to each monitor circuit.

23. A computer system as defined in claim 22 wherein each said module includes only a single said operational circuit.

24. A computer system as defined in claim 21 wherein each said module includes only a single said operational circuit.

* * * * *